US012088001B2

(12) United States Patent
Yoon et al.

(10) Patent No.: US 12,088,001 B2
(45) Date of Patent: Sep. 10, 2024

(54) ANTENNA DEVICE AND DISPLAY DEVICE INCLUDING THE SAME

(71) Applicant: DONGWOO FINE-CHEM CO., LTD., Jeollabuk-do (KR)

(72) Inventors: Ho Dong Yoon, Gyeonggi-do (KR); Yun Seok Oh, Gyeonggi-do (KR); Han Sub Ryu, Gyeongsangbuk-do (KR); Won Hee Lee, Incheon (KR)

(73) Assignee: DONGWOO FINE-CHEM CO., LTD., Jeollabuk-Do (KR)

( * ) Notice: Subject to any disclaimer, the term of this patent is extended or adjusted under 35 U.S.C. 154(b) by 324 days.

(21) Appl. No.: 17/690,313

(22) Filed: Mar. 9, 2022

(65) Prior Publication Data

US 2022/0200134 A1 Jun. 23, 2022

Related U.S. Application Data

(63) Continuation of application No. PCT/KR2020/012007, filed on Sep. 7, 2020.

(30) Foreign Application Priority Data

Sep. 11, 2019 (KR) ........................ 10-2019-0112962
Apr. 3, 2020 (KR) ........................ 10-2020-0041053

(51) Int. Cl.
*H01Q 1/24* (2006.01)
*H01Q 1/36* (2006.01)
(Continued)

(52) U.S. Cl.
CPC ............... *H01Q 1/243* (2013.01); *H01Q 1/36* (2013.01); *H01Q 9/0414* (2013.01); *H01Q 21/06* (2013.01)

(58) Field of Classification Search
CPC ........ H01Q 1/243; H01Q 1/36; H01Q 9/0414; H01Q 21/06; H01Q 1/1271; H01Q 1/38;
(Continued)

(56) References Cited

U.S. PATENT DOCUMENTS

2007/0279285 A1* 12/2007 Hilgers .................... H01Q 5/40 343/700 MS
2011/0102268 A1* 5/2011 Watanabe .............. H01Q 21/30 343/700 MS (Continued)

FOREIGN PATENT DOCUMENTS

JP 2014-236323 A 12/2014
JP 2018-142872 A 9/2018

(Continued)

OTHER PUBLICATIONS

International Search Report for PCT/KR2020/012007 mailed on Jan. 8, 2021.

*Primary Examiner* — David E Lotter
(74) *Attorney, Agent, or Firm* — The PL Law Group, PLLC

(57) ABSTRACT

An antenna device according to an embodiment of the present invention includes a dielectric layer, a first antenna unit having a bent structure and extending along an upper surface, a lateral surface and a lower surface of the dielectric layer, and a second electrode pattern having a bent structure and extending along the lateral surface and the lower surface of the dielectric layer.

16 Claims, 7 Drawing Sheets

(51) Int. Cl.
*H01Q 9/04* (2006.01)
*H01Q 21/06* (2006.01)

(58) Field of Classification Search
CPC .... H01Q 9/0407; H01Q 21/205; H01Q 1/242; H01Q 1/48; H01Q 1/50
See application file for complete search history.

(56) References Cited

U.S. PATENT DOCUMENTS

| | | | | |
|---|---|---|---|---|
| 2019/0220123 | A1* | 7/2019 | Kanaya | H10K 59/40 |
| 2020/0136238 | A1* | 4/2020 | Iwata | H05K 1/028 |

FOREIGN PATENT DOCUMENTS

| | | | |
|---|---|---|---|
| KR | 10-2016-0059291 | A | 5/2016 |
| KR | 10-1940798 | B1 | 1/2019 |
| KR | 10-2019-0080699 | A | 7/2019 |
| KR | 10-1962821 | B1 | 7/2019 |

* cited by examiner

ANTENNA DEVICE AND DISPLAY DEVICE INCLUDING THE SAME

CROSS-REFERENCE TO RELATED APPLICATION PRIORITY

The present application is a continuation application to International Application No. PCT/KR2020/012007 with an International Filing Date of Sep. 7, 2020, which claims the benefit of Korean Patent Applications Nos. 10-2019-0112962 filed on Sep. 11, 2019 and 10-2020-0041053 filed on Apr. 3, 2020 in the Korean Intellectual Property Office (KIPO), the entire disclosures of which are incorporated by reference herein.

BACKGROUND

1. Technical Field

The present invention relates to an antenna device and a display device including the same. More particularly, the present invention relates to an antenna device including an electrode and a dielectric layer, and a display device including the same.

2. Background Art

As information technologies have been developed, a wireless communication technology such as Wi-Fi, Bluetooth, etc., is combined with a display device in, e.g., a smartphone form. In this case, an antenna may be combined with the display device to provide a communication function.

As mobile communication technologies have been rapidly developed, an antenna capable of operating a high frequency or ultra-high frequency communication is needed in the display device. Further, as the display device equipped with the antenna becomes thinner and light-weighted, a space for the antenna may be also decreased. Accordingly, a high frequency and broadband signal transmission and reception may not be easily implemented in a limited space. For example, in a recent 5G high frequency band communication, as a wavelength becomes shorter, the signal transmission and reception may be blocked. Thus, a multi-axis signaling may be advantageous for a reduction of a signal loss.

Further, when a film or patch type antenna is applied in a thin display device, a radiation reliability in the high frequency or ultra-high frequency communication may not be easily achieved.

For example, Korean Published Patent Application No. 2016-0059291 discloses an antenna integrated into a display panel, which may not provide sufficient high frequency radiation reliability in a limited space.

SUMMARY

According to an aspect of the present invention, there is provided an antenna device having improved gain and signaling efficiency.

According to an aspect of the present invention, there is provided a display device including an antenna device with improved gain and signaling efficiency.

(1) An antenna device, comprising: a dielectric layer; a first antenna unit having a bent structure and extending along an upper surface, a lateral surface and a lower surface of the dielectric layer; and a second antenna unit having a bent structure and extending along the lateral surface and the lower surface of the dielectric layer.

(2) The antenna device according to the above (1), wherein the lateral surface of the dielectric layer has a curved shape.

(3) The antenna device according to the above (1), wherein the first antenna unit includes a first radiator, a first transmission line extending from the first radiator and a first signal pad connected to an end portion of the first transmission line, and the second antenna unit includes a second radiator, a second transmission line extending from the second radiator and a second signal pad connected to an end portion of the second transmission line.

(4) The antenna device according to the above (3), wherein the first radiator is disposed on the upper surface of the dielectric layer, the first transmission line is disposed on the lateral surface of the dielectric layer, and the first signal pad is disposed on the lower surface of the dielectric layer.

(5) The antenna device according to the above (3), wherein the second radiator is disposed on the lateral surface of the dielectric layer, the second signal pad is disposed on the lower surface of the dielectric layer, and the second transmission line extends between the second radiator and the second signal pad.

(6) The antenna device according to the above (5), wherein the second radiator has a curved shape.

(7) The antenna device according to the above (5), further comprising a ground pattern disposed at an inner side of the dielectric layer to face the second radiator with the dielectric layer interposed therebetween.

(8) The antenna device according to the above (3), wherein the first antenna unit further comprises a first ground pad disposed around the first signal pad to be spaced apart from the first transmission line and the first signal pad, and the second antenna unit further comprises a second ground pad disposed around the second signal pad to be spaced apart from the second transmission line and the second signal pad.

(9) The antenna device according to the above (1), wherein the dielectric layer is formed by folding a preliminary dielectric layer in a planar state including a first region, a second region and a third region such that the second region is bent so that the first region and the third region face each other, and a surface of the second region of the preliminary dielectric layer corresponds to the lateral surface of the dielectric layer.

(10) The antenna device according to the above (1), wherein a plurality of the first antenna units and a plurality of the second antenna units are alternately and repeatedly arranged in a horizontal direction.

(11) The antenna device according to the above (1), wherein the first antenna unit and the second antenna unit include a mesh structure.

(12) The antenna device according to the above (11), further comprising a dummy mesh pattern disposed around the first antenna unit and the second antenna unit to be spaced apart from the first antenna unit and the second antenna unit.

(13) The antenna device according to the above (1), further comprising a third antenna unit including a third radiator disposed on the lower surface of the dielectric layer.

(14) The antenna device according to the above (13), wherein the third antenna unit further comprises a third transmission line extending from the third radiator and a third signal pad connected to an end portion of the third transmission line.

(15) The antenna device according to the above (14), wherein the third transmission line and the third signal pad are disposed on the lower surface of the dielectric layer together with the third radiator.

(16) A display device, comprising: a display panel including an electrode structure; and an antenna device according to embodiments as described above disposed on the display panel.

(17) The display device according to the above (16), wherein the electrode structure serves as a ground layer of the first antenna unit.

According to exemplary embodiments of the present invention, an antenna device may include a dielectric layer and an antenna unit disposed on upper, lateral and/or lower surfaces of the dielectric layer and having a bent structure. Accordingly, the antenna device may be disposed on a lateral side of the display device, and a space occupied by the antenna device may be reduced.

A plurality of the antenna units may be formed, and radiators of the antenna units may each be disposed on the upper surface, the lateral surface, and the lower surface of the dielectric layer. Accordingly, a double polarization or a multi-axis directional signal transmission and reception may be implemented in a limited space, and high-frequency and broadband signal transmission and reception may be also implemented.

In some embodiments, a plurality of the radiators may be alternately and repeatedly disposed on the upper and lateral surfaces of the dielectric layer.

Accordingly, a radiation coverage for substantially an entire area may be implemented, thereby increasing signal transmission/reception efficiency and sensitivity.

The antenna device may be applied to a display device including a mobile communication device capable of transmitting and receiving a high-frequency/ultra-high frequency band of 3G, 4G, 5G or higher, thereby improving optical properties such as transmittance and radiation properties.

DETAILED DESCRIPTION OF THE EMBODIMENTS

According to exemplary embodiments of the present invention, there is provided an antenna device including a dielectric layer and a plurality of antenna units that may be disposed throughout on an upper surface, a lateral surface and/or a lower surface and may have a bent structure.

The antenna device may be, e.g., a microstrip patch antenna fabricated in the form of a transparent film. The antenna device may be applied to communication devices for a mobile communication of a high or ultrahigh frequency band corresponding to a mobile communication of, e.g., 3G, 4G, 5G or more.

According to exemplary embodiments of the present invention, there is also provided a display device including the antenna device.

Hereinafter, the present invention will be described in detail with reference to the accompanying drawings. However, those skilled in the art will appreciate that such embodiments described with reference to the accompanying drawings are provided to further understand the spirit of the present invention and do not limit subject matters to be protected as disclosed in the detailed description and appended claims.

Figure 1:
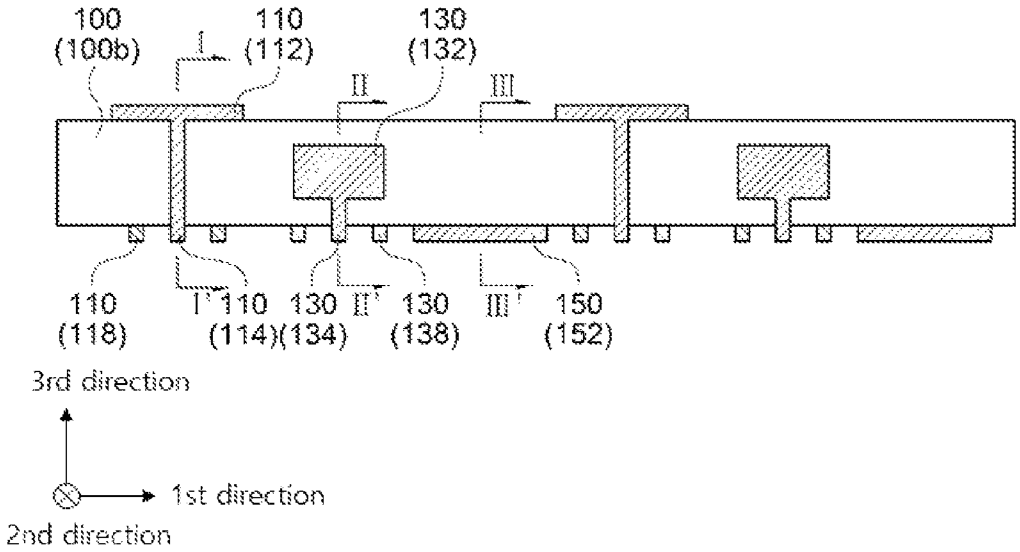
FIG. 1 is a schematic lateral side view illustrating an antenna device in accordance with exemplary embodiments.

FIG. 1 is a schematic lateral side view illustrating an antenna device in accordance with exemplary embodiments In FIG. 1, two directions parallel to an upper surface of a dielectric layer 100 and crossing each other are defined as a first direction and a second direction. For example, the first direction and the second direction may be perpendicular to each other. A direction vertical to the upper surface of the dielectric layer 100 is defined as a third direction. For example, the first direction may correspond to a width direction of the antenna device, the second direction may correspond to a length direction of the antenna device, and the third direction may correspond to a thickness direction of the antenna device. The definitions of the directions may be equally applied to all accompanying drawings.

Referring to FIG. 1, the antenna device according to exemplary embodiments may include the dielectric layer 100, a first antenna unit 110 and a second antenna unit 130. In an embodiment, the antenna device may further include a third antenna unit 150.

The dielectric layer 100 may include a first surface **100*a*, a second surface 100*b*, and a third surface 100*c*. For example, the first surface 100*a*, the second surface 100*b*, and the third surface 100*c* may correspond to an upper surface, a lateral surface, and a lower surface of the dielectric layer 100, respectively. For example, FIG. 1 is a lateral side view of the second surface 100*b* of the dielectric layer 100** in the second direction.

The dielectric layer 100 may include an insulating material having a predetermined dielectric constant. For example, the dielectric layer 100 may include, e.g., a flexible transparent resin material. For example, the dielectric layer 100 may include a polyester-based resin such as polyethylene terephthalate, polyethylene isophthalate, polyethylene naphthalate and polybutylene terephthalate; a cellulose-based resin such as diacetyl cellulose and triacetyl cellulose; a polycarbonate-based resin; an acrylic resin such as polymethyl (meth)acrylate and polyethyl (meth)acrylate; a styrene-based resin such as polystyrene and an acrylonitrile-styrene copolymer; a polyolefin-based resin such as polyethylene, polypropylene, a cycloolefin or polyolefin having a norbornene structure and an ethylene-propylene copolymer; a vinyl chloride-based resin; an amide-based resin such as nylon and an aromatic polyamide; an imide-based resin; a polyethersulfone-based resin; a sulfone-based resin; a polyether ether ketone-based resin; a polyphenylene sulfide resin; a vinyl alcohol-based resin; a vinylidene chloride-based resin; a vinyl butyral-based resin; an allylatebased resin; a polyoxymethylene-based resin; an epoxy-based resin; a urethane or acrylic urethane-based resin; a silicone-based resin, etc. These may be used alone or in a combination of two or more thereof.

In some embodiments, an adhesive film such as an optically clear adhesive (OCA), an optically clear resin (OCR), or the like may be included in the dielectric layer 100.

In some embodiments, the dielectric layer 100 may include an inorganic insulating material such as glass, silicon oxide, silicon nitride, silicon oxynitride, etc.

In some embodiments, the dielectric constant of the dielectric layer 100 may be adjusted in a range from about 1.5 to about 12. When the dielectric constant exceeds about 12, a signal loss at a transmission line may be excessively increased and a signal sensitivity and efficiency may be degraded in a high or ultrahigh frequency band communication.

The antenna unit may include a radiator, a transmission line branching and extending from the radiator and a signal pad connected to an end portion of the transmission line. For example, the first antenna unit 110 may include a first radiator 112, a first transmission line 114 and a first signal pad 116, the second antenna unit 130 may include a radiator 132, a second transmission line 134 and a second signal pad 136, and the third antenna unit 150 may include a third radiator 152, a third transmission line 154 and a third signal pad 156.

In an embodiment, as illustrated in FIG. 1, the first radiator 112 of the first antenna unit 110 may be disposed on the upper surface of the dielectric layer 100, and the first transmission line 114 may extend from one side of the first radiator 112 and extend along a profile of the second surface 100*b* of the dielectric layer 100. The first signal pad 116 may be connected to an end portion of the first transmission line 114 and may be disposed on the lower surface of the dielectric layer 100.

The second radiator 132 of the second antenna unit 130 may be disposed on the second surface 100*b* of the dielectric layer 100, and the second transmission line 134 may extend from one side of the second radiator 132 and extend along a profile of the second surface 100*b* of the dielectric layer 100. The second signal pad 136 may be connected to an end portion of the second transmission line 134 and may be disposed on the lower surface of the dielectric layer 100.

In exemplary embodiments, the third antenna unit 150 including the third radiator 152 may be disposed on the lower surface of the dielectric layer 100.

For example, the third antenna unit 150 may include a third transmission line 154 branching and extending from the third radiator 152 and a third signal pad 156 connected to an end of the third transmission line 154. The third transmission line 154 and the third signal pad 156 may be disposed on the lower surface of the dielectric layer 100 together with the third radiator 152.

The radiators 112, 132 and 152 may have, e.g., a polygonal plate shape as illustrated in FIG. 1, but the shapes of the radiators 112, 132 and 152 may be appropriately modified in consideration of radiation efficiency.

The first antenna unit 110, the second antenna unit 130 and the third antenna unit 150 may further include a first ground pad 118, a second ground pad 138 and a third ground pad 158, respectively. For example, the ground pads 118, 138 158 may be spaced apart from the transmission lines 114, 134 and 154, and the signal pads 116, 136 and 156 around the signal pads 116, 136 and 156 such that a pair of the ground pads 118, 138 and 158 may face each other with the signal pad 116, 136 and 156 interposed therebetween. Accordingly, noises generated when transmitting and receiving a radiation signal may be efficiently filtered or reduced by the ground pads 118, 138, 158, and horizontal radiation properties may be also implemented.

In exemplary embodiments, a plurality of the antenna units 110, 130 and 150 may be arranged in an array shape along the first direction. In an embodiment, the first antenna unit 110 and the second antenna unit 130 may have the same overall length. In an embodiment, a driving frequency may be controlled by adjusting an entire length of each of the first antenna unit 110, the second antenna unit 130 and the third antenna unit 150. In this case, the plurality of the antenna units may have sensitivity to different frequencies, and thus a frequency coverage and a gain amount of the antenna device may be increased.

For example, the antenna units 110, 130 and 150 may include silver (Ag), gold (Au), copper (Cu), aluminum (Al), platinum (Pt), palladium (Pd), chromium (Cr), titanium (Ti), tungsten (W), niobium (Nb), tantalum (Ta), vanadium (V), iron (Fe), manganese (Mn), cobalt (Co), nickel (Ni), zinc (Zn), tin (Sn), molybdenum (Mo), calcium (Ca) or an alloy including at least one thereof. These may be used alone or in combination thereof.

For example, the antenna units 110, 130 and 150 may include silver (Ag) or a silver alloy such as e.g., a silver-palladium-copper (APC) alloy to implement a low resistance. In an embodiment, the antenna unit may include copper (Cu) or a copper alloy (e.g., copper-calcium (CuCa) alloy) in consideration of a low resistance and a fine line width pattern.

In some embodiments, the antenna units 110, 130 and 150 may include a transparent metal oxide such as indium tin oxide (ITO), indium zinc oxide (IZO), indium zinc tin oxide (ITZO), zinc oxide (ZnOx), etc.

In some embodiments, the antenna units 110, 130 and 150 may have a double-layered structure of a transparent conductive oxide layer-a metal layer or a triple-layered structure of a transparent conductive oxide layer-a metal layer-a transparent conductive oxide layer. In this case, while improving a flexible property and lowering a resistance by the metal layer, an anti-corrosive property may be improved by the transparent conductive oxide layer.

Figure 2:
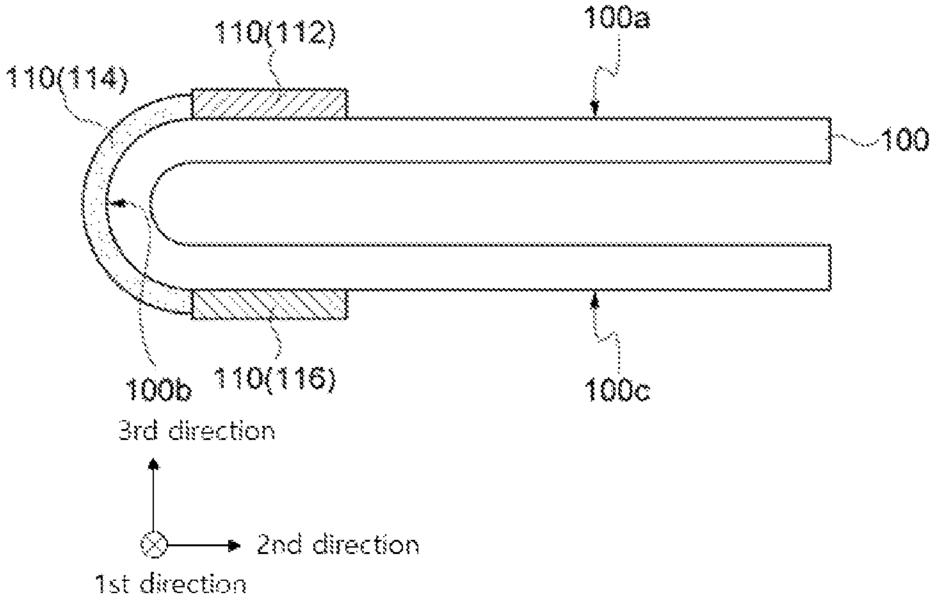
FIGS. 2 to 4 are schematic cross-sectional views illustrating an antenna device in accordance with exemplary embodiments.
Figure 3:
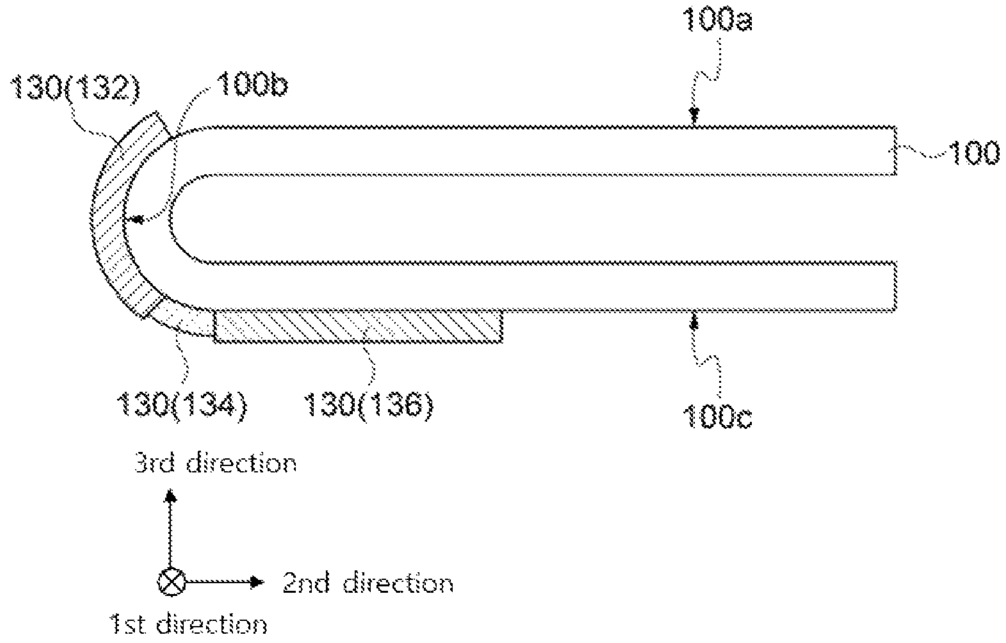
Figure 4:
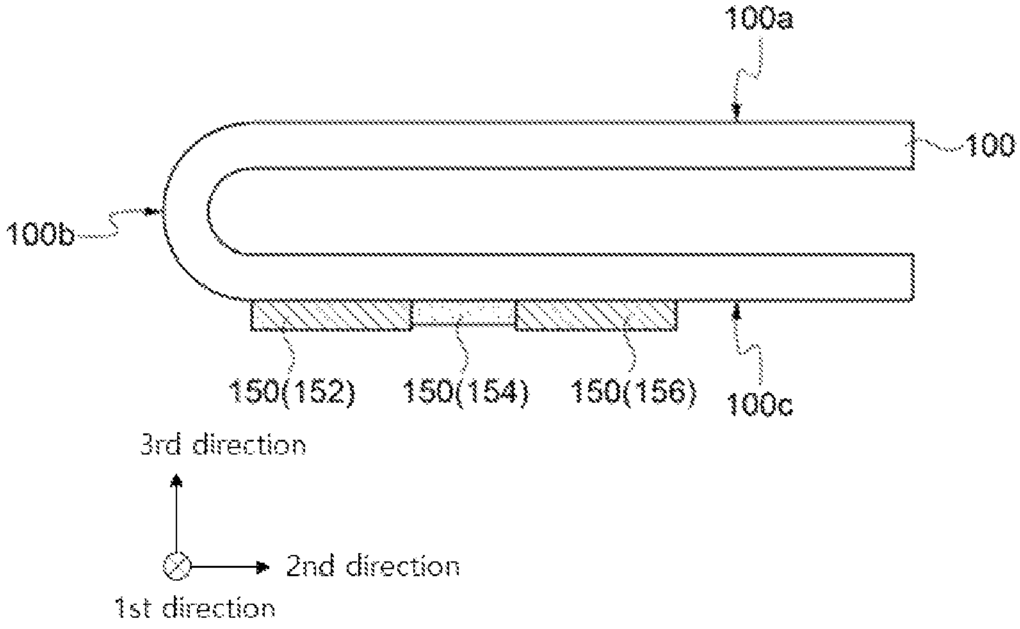

FIGS. 2 to 4 are schematic cross-sectional views illustrating an antenna device in accordance with exemplary embodiments. Specifically, FIG. 2 is a cross-sectional view taken along a line I-I' of FIG. 1. FIG. 3 is a cross-sectional view taken along a line II-IP of FIG. 1. FIG. 4 is a cross-sectional view taken along a line of FIG. 1.

Referring to FIG. 2, in exemplary embodiments, the first radiator 112 of the first antenna unit 110 may be disposed on the first surface 100*a* of the dielectric layer 100, the first transmission line 114 may be disposed on the second surface 100*b* of the dielectric layer 100, and the first signal pad 116 may be disposed on the third surface 100*c* of the dielectric layer 100.

In this case, the first ground pad 118 may also serve as a ground layer for the first radiator 112, and a radiation property in the third direction may be implemented through the first radiator 112.

In some embodiments, a separate ground layer may be formed under the first radiator 112, or a conductive member of a display device to which the antenna device may be applied may serve as the ground layer for the first radiator 112.

The conductive member may include, e.g., a gate electrode of a thin film transistor (TFT) included in a display panel, various wirings such as a scan line and a data line, or various electrodes such as a pixel electrode and a common electrode.

In an embodiment, a metallic member such as a SUS plate, a sensor member such as a digitizer, etc., disposed at a rear portion of the display device may serve as the ground layer.

In some embodiments, the second surface 100*b* of the dielectric layer 100 may have a substantially curved shape. For example, a circumference of the second surface 100*b* of the dielectric layer 100 may have a substantially curved profile such as a semicircular profile.

Referring to FIG. 3, in exemplary embodiments, the second radiator 132 of the second antenna unit 130 may be disposed on the second surface 100*b* of the dielectric layer 100, and the second signal pad 136 may be disposed on the third surface 100*c* of the dielectric layer 100.

In this case, the second transmission line 134 may extend between the second radiator 132 and the second signal pad 136, and the second radiator 132 may have a curved shape along the second surface 100*b* of the dielectric layer 100. Accordingly, a radiation coverage of the second antenna unit 130 may be further increased through the curved second radiator 132 and, a substantially multi-axial radiation property may be implemented.

Referring to FIG. 4, in exemplary embodiments, the third radiator 152, the third transmission line 154 and the third signal pad 156 of the third antenna unit 150 may be disposed on the lower surface, e.g., the third surface 100*c* of the dielectric layer 100.

In this case, the third antenna unit 150 may be utilized by patterning a conductive member of a mobile device to which the antenna device is employed. For example, a metal coating layer included in a back cover of the mobile device may be patterned and may be used as the third antenna unit 150. Accordingly, a space occupied by the antenna device may be reduced, and a double polarization or a multi-axis directional signal transmission and reception may be implemented within a limited space.

In some embodiments, a separate ground layer may be formed to overlap the third radiator 152 in a vertical direction, or the conductive member, the metallic member or the sensor member of the display device to which the antenna device is applied may serve as the ground layer for the third radiator 152.

Figure 5:
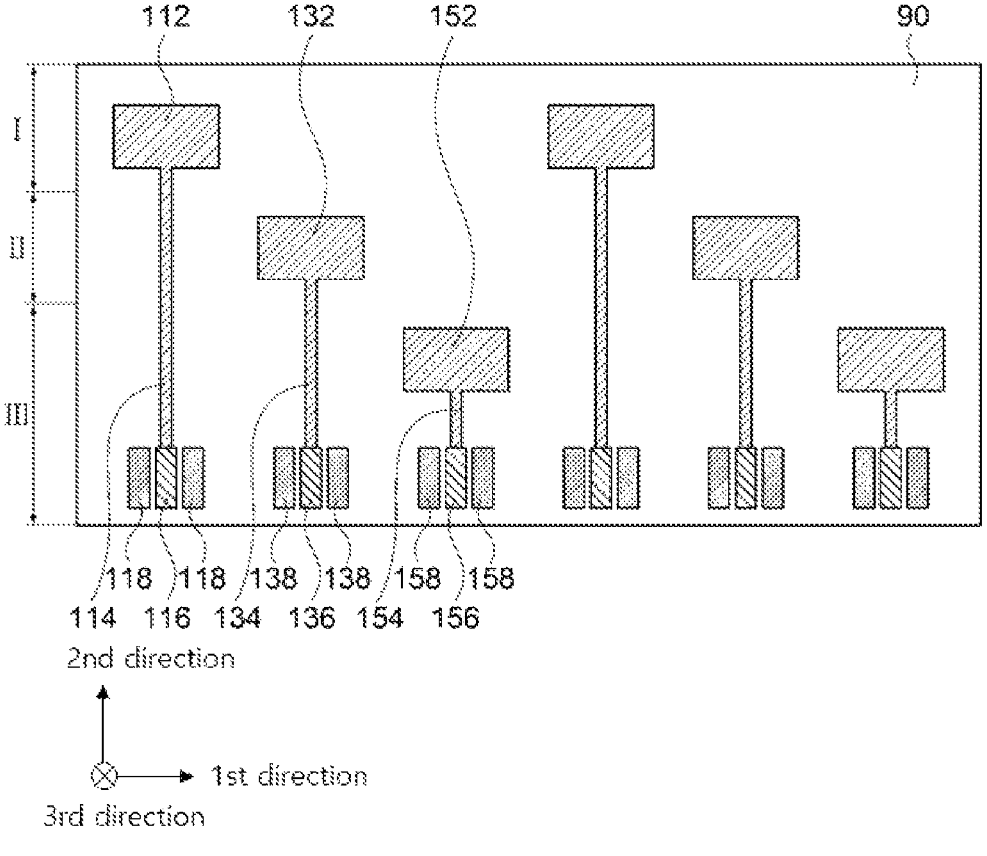
FIG. 5 is a schematic top planar view illustrating an antenna device before being bent in accordance with some exemplary embodiments.

FIG. 5 is a schematic top planar view illustrating an antenna device before being bent in accordance with some exemplary embodiments. Detailed descriptions on elements and structures substantially the same as or similar to those described with reference to FIGS. 1 to 4 are omitted herein.

Referring to FIG. 5, in exemplary embodiments, an antenna device in a planar state before being bent may include a preliminary dielectric layer 90 and the antenna units 110, 130 and 150 formed on the preliminary dielectric layer 90.

The preliminary dielectric layer 90 may refer to a dielectric layer in a planar state before being bent in the form illustrated in FIGS. 1 to 4, and the preliminary dielectric layer 90 may include a first region I, a second region II and a third region III.

After forming the antenna units 110, 130 and 150 on the preliminary dielectric layer 90, the preliminary dielectric layer 90 may be folded such that the first region I and the third region III may face each other by the second region II. For example, the second region II may be bent so that the preliminary dielectric layer 90 may be substantially folded.

In this case, the first region I and the third region III may overlap each other in the third direction. Accordingly, after being bent, the first region I and the third region III may serve as an upper portion and a lower portion, respectively, of the dielectric layer 100, and a surface of the second region II may correspond to the second surface 100*b* of the dielectric layer 100.

The first radiator 112 of the first antenna unit 110 may be disposed on the first region I, and the second radiator 132 of the second antenna unit 130 may be disposed on the second region II, and the third radiator 152 of the third antenna unit 150 may be disposed on the third region III. In this case, the signal pads 116, 136, and 156 may be disposed on the third region III.

In exemplary embodiments, a plurality of the first antenna units 110, a plurality of the second antenna units 130 and a plurality of the third antenna units 150 may be alternately and repeatedly arranged in a horizontal direction. Accordingly, a radiation coverage throughout a substantially entire area may be achieved, thereby increasing signal transmission/reception efficiency and sensitivity. Additionally, a separation distance for suppressing a mutual radiation interference between the adjacent antenna units may be obtained.

According to the above-described exemplary embodiments, the antenna units may be three-dimensionally designed by using the first surface 110*a*, the second surface 110*b* and the third surface 110*c* of the dielectric layer 100. Accordingly, the area occupied by the antenna units may be reduced, and, e.g., a bezel area of the image display device in which the antenna device is located may be also reduced.

Figure 6:
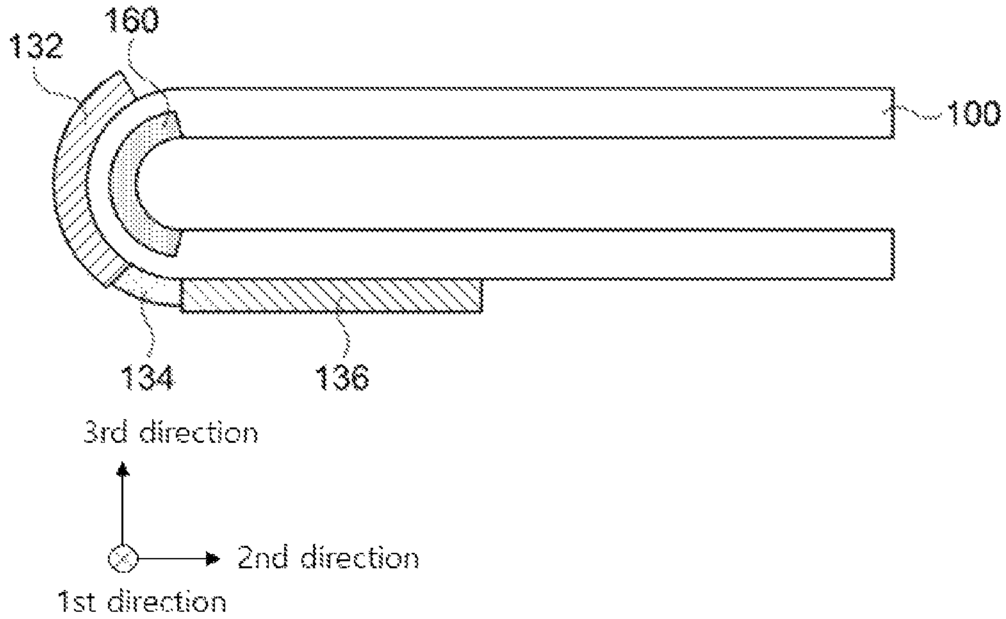
FIG. 6 is a schematic cross-sectional view illustrating an antenna device in accordance with some exemplary embodiments.
Figure 7:
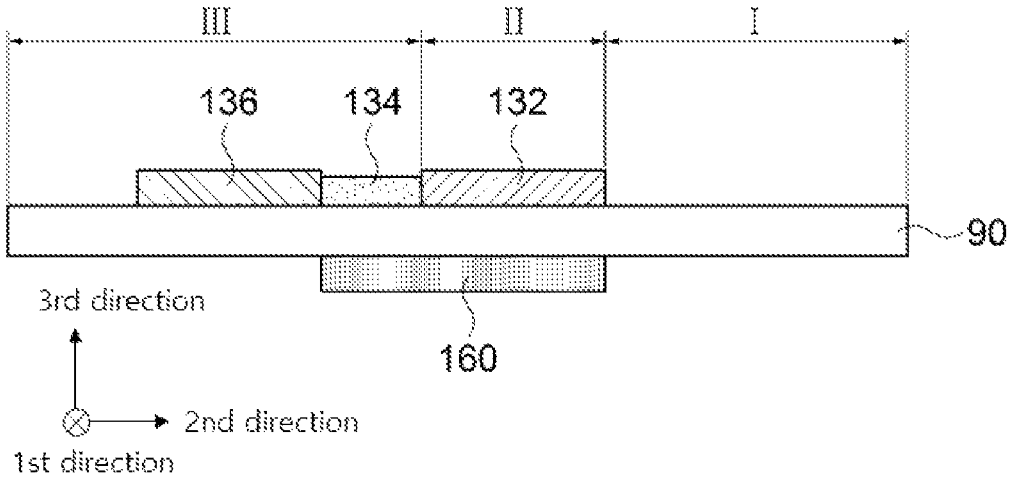
FIG. 7 is a schematic cross-sectional view illustrating an antenna device before being bent in accordance with some exemplary embodiments.

FIG. 6 is a schematic cross-sectional view illustrating an antenna device in accordance with some exemplary embodiments. FIG. 7 is a schematic cross-sectional view illustrating an antenna device before being bent in accordance with some exemplary embodiments. Specifically, FIGS. 6 and 7 are cross-sectional views taken along the line II-II' of FIG. 1. Detailed descriptions of elements and structures substantially the same as or similar to those described with reference to FIGS. 1 to 5 are omitted herein.

Referring to FIG. 6, the antenna device according to some exemplary embodiments may further include a ground pattern 160. The ground pattern 160 may be formed at an inner side of the dielectric layer 100 and may face the second radiator 132 in the second direction with the dielectric layer 100 interposed therebetween. Accordingly, capacitance or inductance may be created in the length direction of the antenna device, so that a frequency band at which the antenna device is operated may be adjusted. Additionally, a lateral radiation through the second surface 100*b* of the dielectric layer 100 may be implemented.

For example, a distance between the antenna unit and the ground pattern 160 may be from 40 μm to 1,000 μm. In this case, a resonance frequency corresponding to, e.g., 3G, 4G, 5G or more high or ultrahigh frequency band may be easily implemented.

Referring to FIG. 7, the second antenna unit 130 may be formed on an upper surface of the preliminary dielectric layer 90, and the ground pattern 160 may be formed on a lower surface of the preliminary dielectric layer 90.

For example, the second radiator 132 may be formed on the upper surface of the second region II of the preliminary dielectric layer 90, and the second signal pad 136 may be formed on a portion of the upper surface in the third region III of the preliminary dielectric layer 90. The second transmission line 134 may extend between the second radiator 132 and the second signal pad 136. The ground pattern 160 may be formed on the lower surface of the second region II of the preliminary dielectric layer 90.

The preliminary dielectric layer on which the second antenna unit 130 and the ground pattern 160 are formed may be bent via the second region II such that the ground pattern 160 may be positioned at the inner side of the dielectric layer 100. Accordingly, the ground pattern 160 may be substantially surrounded by the first region I and the third region III. In some embodiments, the ground pattern 160 may be substantially embedded in the dielectric layer 100.

As illustrated in FIG. 6, the second radiator 132 and the ground pattern 160 may have a curved pattern shape such as a C-shape. Thus, a radiation direction may be expanded to increase the radiation coverage.

Figure 8:
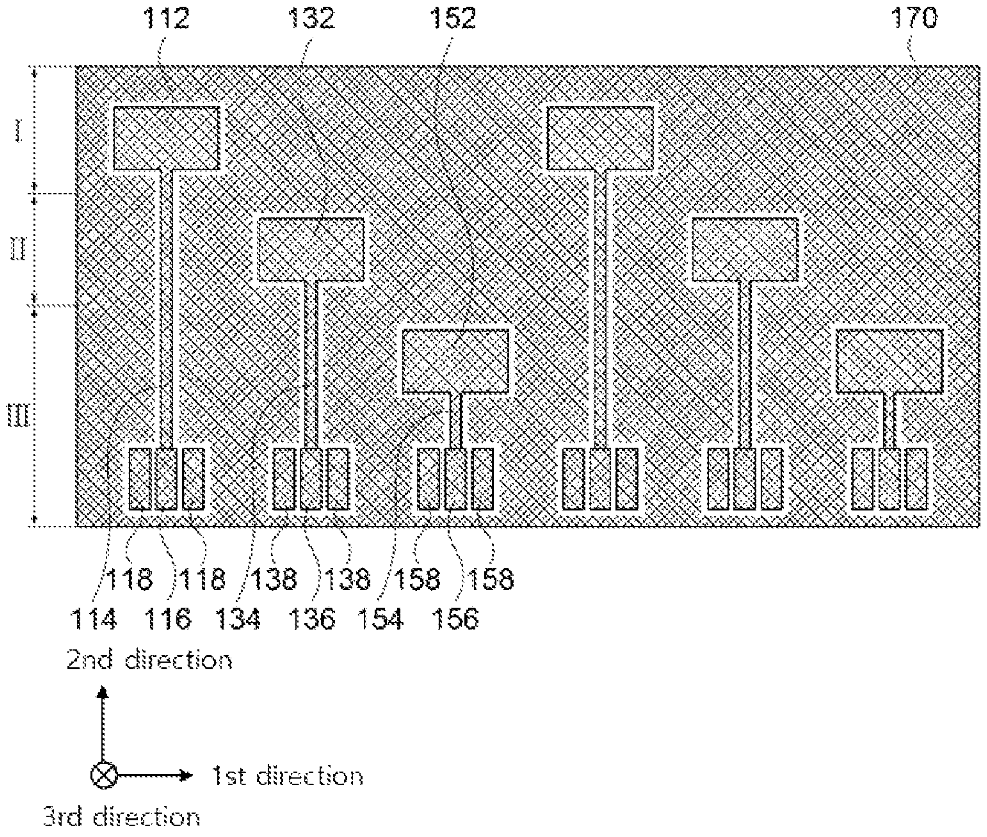
FIG. 8 is a schematic top planar view illustrating an antenna device before being bent in accordance with some exemplary embodiments.

FIG. 8 is a schematic top planar view illustrating an antenna device before being bent in accordance with some exemplary embodiments.

Referring to FIG. 8, the antenna device may include the antenna units 110, 130 and 150 formed on the preliminary dielectric layer 90 and a dummy mesh pattern 170 spaced apart from and arranged around the antenna units 110, 130 and 150.

In exemplary embodiments, the antenna units 110, 130 and 150 may include a mesh structure. For example, the radiators 112, 132 and 152 and the transmission lines 114, 134 and 154 may include a mesh structure. Accordingly, transmittance of the antenna units 110, 130, and 150 may be increased, and flexibility of the antenna device may be also improved.

In some embodiments, electrode lines included in the mesh structure may be formed of a low resistance metal such as copper, a copper alloy (e.g., CuCa), silver, a silver alloy (e.g., silver-palladium-copper (APC)) to suppress a resistance increase. Thus, a transparent antenna device having low resistance and high sensitivity may be effectively implemented.

The dummy mesh pattern 170 and the antenna units 110, 130 and 150 may include substantially the same mesh structure. Accordingly, an electrode arrangement around the antenna unit may become uniform to prevent the mesh structure or the electrode lines included therein from being visually recognized by a user of the display device to which the antenna device is applied.

Figure 9:
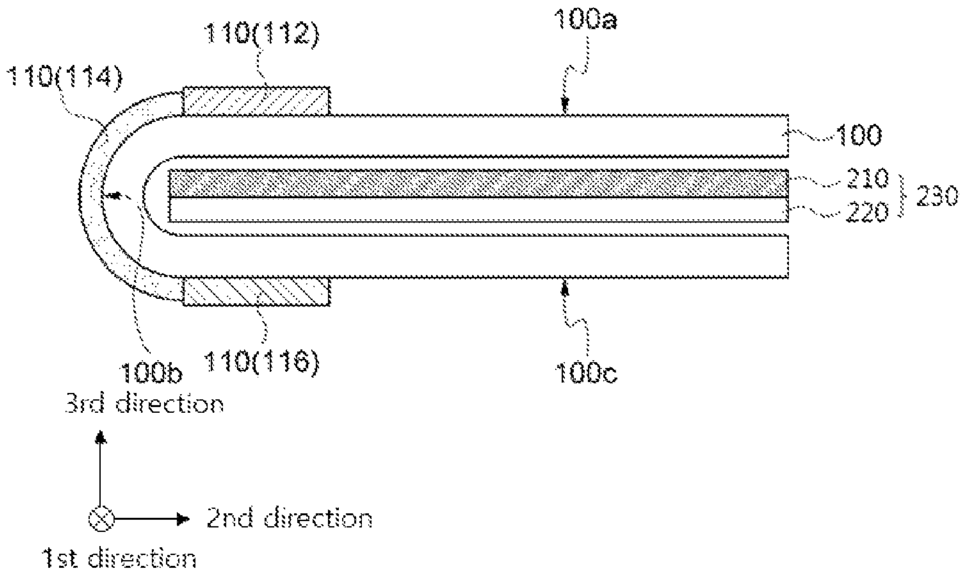
FIG. 9 is a schematic cross-sectional view illustrating an antenna device in accordance with some exemplary embodiments.

FIG. 9 is a schematic cross-sectional view illustrating an antenna device in accordance with some exemplary embodiments. Specifically, FIG. 9 is a schematic cross-sectional view taken along the line II-II' of FIG. 1. Detailed descriptions on elements and configurations substantially the same as or similar to those described with reference to FIGS. 1 to 5 are omitted herein.

Referring to FIG. 9, the antenna device may be disposed on a display panel 230. For example, the display panel 230 may include a flat or curved LCD panel or an OLED panel, and the antenna device may be formed in a curved shape along a lateral portion of the display panel 230.

In exemplary embodiments, after forming the antenna units 110, 130 and 150 on the preliminary dielectric layer 90, the second region II may be folded such that the first region I and the third region III may face each other, and the antenna device may be disposed on the display panel 230. For example, the display panel 230 and the preliminary dielectric layer 90 may be bonded to each other through an adhesive layer, and the adhesive layer may include a material having a dielectric constant.

The display panel 230 may serve as a ground layer of the antenna unit. For example, the display panel 230 may include an electrode layer 210 formed on a panel substrate 220, and a conductive member of the electrode layer 210 may serve as the ground layer of the antenna device.

In exemplary embodiments, the first region I of the dielectric layer 100 may be disposed on the electrode layer 210, and the second region II of the dielectric layer 100 may be folded along a lateral surface of the display panel 230. For example, when a curved OLED is used as the display panel 230, the conductive member of the display panel 230 may be used as the ground layer for the first radiator 112 disposed on the first region I and the second radiator 132 disposed on the second region II.

In some embodiments, the third region III of the dielectric layer 100 may be disposed under the display panel 230. Accordingly, a conductive member formed on the lower surface of the display panel 230 may serve as a ground layer of the third radiator 152.

Figure 10:
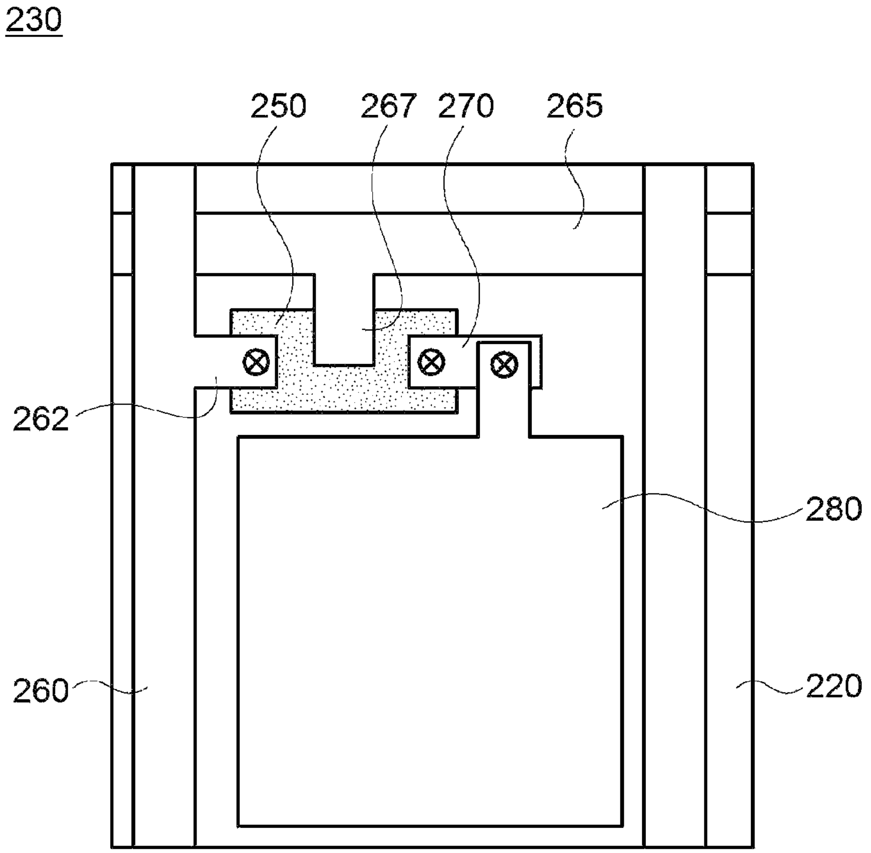
FIGS. 10 and 11 are schematic top planar views illustrating a display device in accordance with exemplary embodiments.
Figure 11:
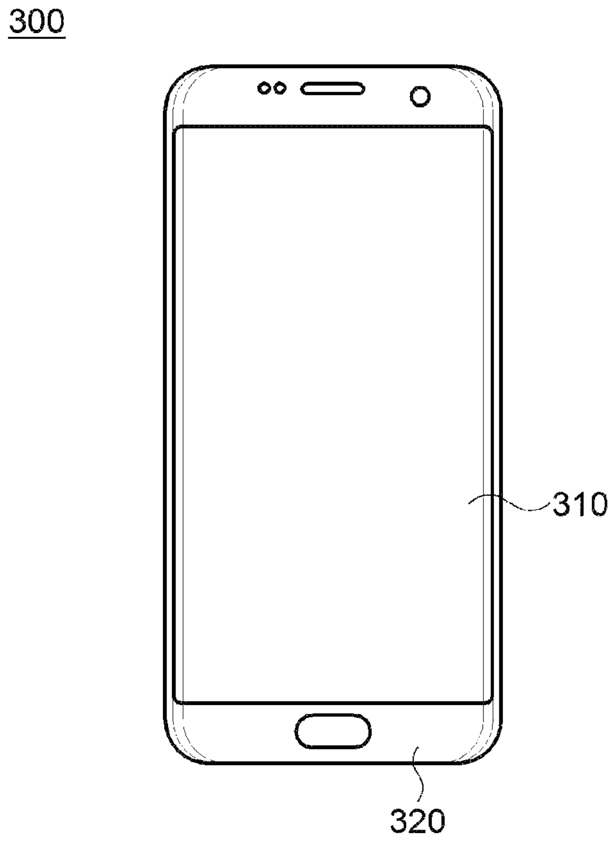

FIGS. 10 and 11 are schematic top planar views illustrating a display device in accordance with exemplary embodiments. For example, FIG. 10 is a schematic top planar view illustrating an electrode construction included in a display panel. FIG. 11 illustrates an outer shape of a display device including a window.

Referring to FIG. 10, the display device may include the antenna device formed on a display panel 230, and the display panel 230 may include a panel substrate 220 and an electrode layer 210. For example, the display panel 230 may be a display panel such as an LCD panel or an OLED panel.

The electrode layer 210 may include a pixel structure including a thin film transistor TFT, a wiring structure and an electrode structure. For example, a TFT including an active layer 250, various wiring structures such as a scan line 265 and a data line 260, the electrode structure such as a source electrode 262, a gate electrode 267, a drain electrode 270, a pixel electrode 280, etc., included in the display panel may be the conductive member of the display panel 230.

Thus, the conductive member included in the display panel may be utilized as the ground layer without forming an additional ground layer under the radiators 112, 132 and 152 of the antenna device.

Referring to FIG. 11, the display device 300 may include a display area 310 and a peripheral area 320. The peripheral area 320 may be disposed on both lateral portions and/or both end portions of the display area 310

The peripheral area 320 may correspond to, e.g., a light-shielding portion or a bezel portion of an image display device. An integrated circuit (IC) chip for controlling driving/radiation properties of the antenna device and supplying a feeding signal may be disposed in the peripheral area 320.

The antenna device according to the above-described exemplary embodiments may be inserted into the peripheral area 320 in the form of, e.g., an antenna film or an antenna patch. As described above, the antenna device may be three-dimensionally disposed by the second surface 100*b* or the second region II. Accordingly, an area or a volume of the peripheral area 320 may be reduced, and a size of the display area 310 in which an image is displayed may be relatively increased.

In an embodiment, the antenna device may be at least partially positioned in the display area 310. In this case, as described with reference to FIG. 8, the antenna unit may include a mesh structure, and deterioration of an image quality by the antenna unit may be prevented.

What is claimed is:

1. An antenna device comprising:

a dielectric layer;

a first antenna unit having a bent structure and extending along an upper surface, a lateral surface and a lower surface of the dielectric layer; and a second antenna unit having a bent structure and extending along the lateral surface and the lower surface of the dielectric layer, wherein the first antenna unit includes a first radiator, a first transmission line extending from the first radiator and a first signal pad connected to an end portion of the first transmission line, and wherein the first radiator is disposed on the upper surface of the dielectric layer, the first transmission line is disposed on the lateral surface of the dielectric layer, and the first signal pad is disposed on the lower surface of the dielectric layer.

2. The antenna device according to claim 1, wherein the lateral surface of the dielectric layer has a curved shape.

3. The antenna device according to claim 1, wherein the second antenna unit includes a second radiator, a second transmission line extending from the second radiator and a second signal pad connected to an end portion of the second transmission line.

4. An antenna device comprising:

a dielectric layer;

a first antenna unit having a bent structure and extending along an upper surface, a lateral surface and a lower surface of the dielectric layer; and a second antenna unit having a bent structure and extending along the lateral surface and the lower surface of the dielectric layer, wherein the first antenna unit includes a first radiator, a first transmission line extending from the first radiator and a first signal pad connected to an end portion of the first transmission line, and the second antenna unit includes a second radiator, a second transmission line extending from the second radiator and a second signal pad connected to an end portion of the second transmission line, wherein the second radiator is disposed on the lateral surface of the dielectric layer, the second signal pad is disposed on the lower surface of the dielectric layer, and the second transmission line extends between the second radiator and the second signal pad.

5. The antenna device according to claim 4, wherein the second radiator has a curved shape.

6. The antenna device according to claim 4, further comprising a ground pattern disposed at an inner side of the dielectric layer to face the second radiator with the dielectric layer interposed therebetween.

7. An antenna device comprising:

a dielectric layer;

a first antenna unit having a bent structure and extending along an upper surface, a lateral surface and a lower surface of the dielectric layer; and a second antenna unit having a bent structure and extending along the lateral surface and the lower surface of the dielectric layer, wherein the first antenna unit includes a first radiator, a first transmission line extending from the first radiator and a first signal pad connected to an end portion of the first transmission line, and the second antenna unit includes a second radiator, a second transmission line extending from the second radiator and a second signal pad connected to an end portion of the second transmission line, wherein the first antenna unit further comprises a first ground pad disposed around the first signal pad to be spaced apart from the first transmission line and the first signal pad, and the second antenna unit further comprises a second ground pad disposed around the second signal pad to be spaced apart from the second transmission line and the second signal pad.

8. The antenna device according to claim 1, wherein the dielectric layer is formed by folding a preliminary dielectric layer in a planar state including a first region, a second region and a third region such that the second region is bent so that the first region and the third region face each other, and a surface of the second region of the preliminary dielectric layer corresponds to the lateral surface of the dielectric layer.

9. The antenna device according to claim 1, wherein a plurality of the first antenna units and a plurality of the second antenna units are alternately and repeatedly arranged in a horizontal direction.

10. The antenna device according to claim 1, wherein the first antenna unit and the second antenna unit include a mesh structure.

11. The antenna device according to claim 10, further comprising a dummy mesh pattern disposed around the first antenna unit and the second antenna unit to be spaced apart from the first antenna unit and the second antenna unit.

12. The antenna device according to claim 1, further comprising a third antenna unit including a third radiator disposed on the lower surface of the dielectric layer.

13. The antenna device according to claim 12, wherein the third antenna unit further comprises a third transmission line extending from the third radiator and a third signal pad connected to an end portion of the third transmission line.

14. The antenna device according to claim 13, wherein the third transmission line and the third signal pad are disposed on the lower surface of the dielectric layer together with the third radiator.

15. A display device, comprising:

a display panel including an electrode structure; and an antenna device according to claim 1 disposed on the display panel.

16. The display device according to claim 15, wherein the electrode structure serves as a ground layer of the first antenna unit.

* * * * *